Sept. 19, 1961 H. M. TAFT 3,001,181

MEANS AND METHOD FOR SETTING AND LOCKING MAGNETIC TRANSDUCER HEADS IN A MAGNETIC DRUM DEVICE

Filed Sept. 16, 1957 2 Sheets-Sheet 1

INVENTOR

Hugh M. Taft

BY Sughrue & Rothwell

ATTORNEYS

INVENTOR
Hugh M. Taft
BY Sughrue & Rothwell
ATTORNEYS

United States Patent Office 3,001,181
Patented Sept. 19, 1961

3,001,181
MEANS AND METHOD FOR SETTING AND LOCKING MAGNETIC TRANSDUCER HEADS IN A MAGNETIC DRUM DEVICE

Hugh M. Taft, Springfield, Vt., assignor, by mesne assignments, to Ex-Cell-O Corporation, Detroit, Mich., a corporation of Michigan
Filed Sept. 16, 1957, Ser. No. 684,278
10 Claims. (Cl. 340—174.1)

This invention relates to magnetic data storage devices in general and in particular to a means and method of fixing the proper physical relationship between the magnetizable drum surface and the magnetic flux path elements of the signal pulse transmitting heads, hereinafter denoted as heads.

Such a head, as is well known in the art, may have at least two magnetic flux path or pole forming elements accommodated in its end facing the drum perimeter in a generally radial direction. These magnetic pole elements are fixed close to each other to define a narrow spacing commonly oriented in a direction such that the magnetic flux therebetween extends in a direction substantially transverse to the rotative axis of the drum, and these elements terminate a distance from the drum perimeter to define an exactly predetermined air gap. This air gap measures only a few thousandths of an inch, and present design trends of these devices often include demands for air gaps of less than a thousandth of an inch. A magnetic drum assembly may include several hundred heads which have to be fixed with correct flux path orientation and located radially to form exact and equal air gaps. With presently known technique this involves tedious and time-consuming work by high-skilled operators.

It is therefore an object of this invention to provide a means and method for simplifying the operation of orienting the flux paths forming the air gaps of a multiplicity of heads in a magnetic drum storage device.

Another object is to provide a head in combination with fastening means that automatically and positively orients the direction of the spacing of the pole elements and simultaneously locks the heads in position.

A further object is to provide a method of positively and automatically establishing the required air gap between the heads and the drum.

Still a further object is to provide a head and a fastener therefor that is inexpensive to manufacture, and an assembly method that does not require more than normal skill by the operator.

Further objects and advantages of the invention will be apparent from the following description taken in connection with accompanying drawings, wherein.

Figure 6:
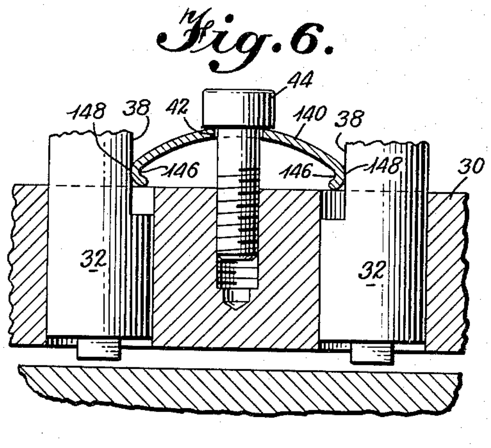
FIG. 6 is a side sectional elevation of another variation of the fastener clip.
Figure 6A:
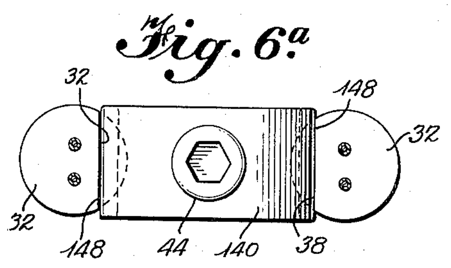

FIG. 6*a* is a plan view of the clip of FIGURE 6.

Figure 7:
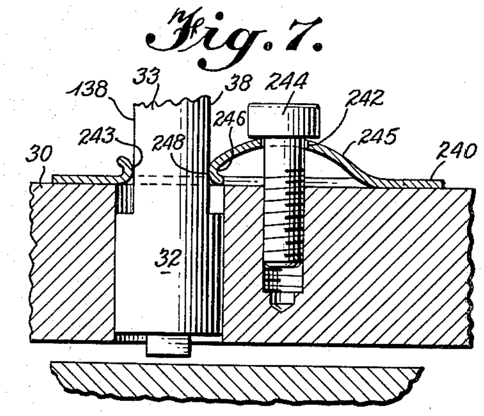

FIG. 7 is a side sectional view of a different embodiment of a spring fastener clip.

Figure 7A:
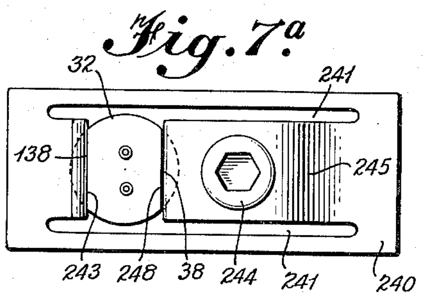

FIG. 7*a* is a plan view of the clip of FIGURE 7.

Figure 8:
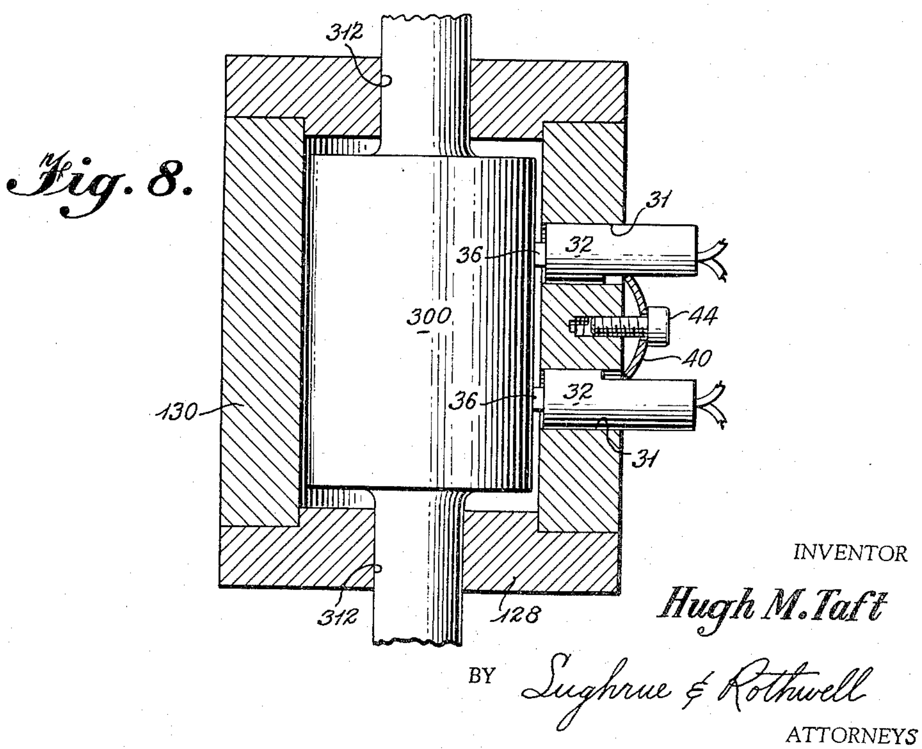

FIG. 8 is a sectional elevation of a cylindrical drum assembly illustrating an alternate embodiment of the invention.

Figures 1, 2, 4:
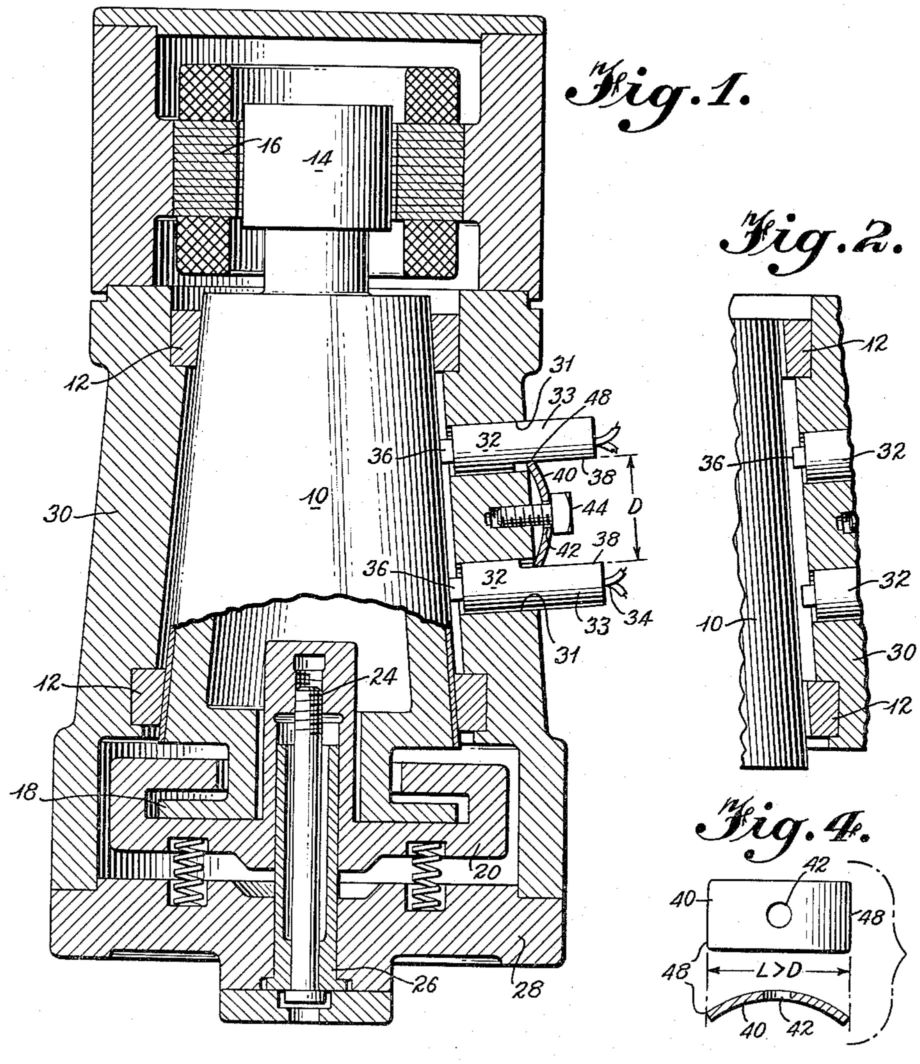
FIG. 1 is a side elevation view, partially in section, of a magnetic drum incorporating this invention.
FIG. 2 is a fragmental view of a portion of FIG. 1.
FIG. 4 is an illustrative showing of a fastener spring clip for the head of FIG. 3.

FIGURE 1 is a somewhat simplified showing of a magnetic data storage device in general as disclosed in my pending application No. 649,984, filed April 1, 1957, wherein the rotatable drum proper 10 has the form of a truncated right circular cone, the perimeter of which is provided with a magnetizable surface layer, and where the perimeter includes journal portions adapted to be rotatably supported in complimentary bearings 12—12. In one end of the drum a rotor 14 together with a stator 16 of an electric motor forms the driving means, and in the other end a thrust bearing runner 18 cooperates with a thrust bearing box 20 which is adjustable on a trunnion 26 along the rotative axis of the drum by means of a screw 24. The stator, bearings, screw and trunnion are supported by elements of a structure 28. A portion of this strucure is a housing 30 which affords the mountings for the heads.

Figure 3:
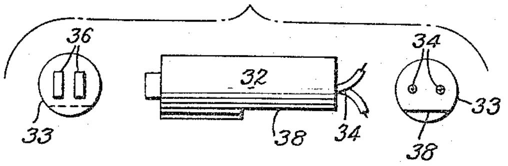
FIG. 3 is an illustrative showing of a head structure of this invention.

In FIGURE 3 is shown a head 32, particularly adapted for this invention, having a cylindrical body 33 containing the usual electromagnetic components, i.e., windings and core. In one end are shown leads 34, and in the other end are shown magnetic flux path forming elements or poles 36. In the side elevation view in the middle of FIGURE 3 these elements are, for the sake of clarity, shown protruding from the extreme end of body 33, and the end view at the left side of FIG. 3 illustrates the spacing gap between the elements which together with the magnetizable layer define the flux path. The body 33, towards the end containing the leads is provided with a flattened portion 38 parallel with a plane which will contain the magnetic lines of flux from the elements 36 as shown in end view at the right side of FIG. 3 compared with the end view at the left side of FIG. 3. The housing 30 is provided with holes 31 in which the heads snugly fit with their longitudinal axes thereof extending in a substantially radial direction relative the rotative axis of the drum but normal to the drum surface. The heads are arranged in pairs with the flats facing each other at a distance "D."

FIG. 4 shows a spring fastener clip 40 of flexible material in the form of a rectangular washer having a lengthwise extension "L" greater than the distance "D," and a width preferably equal to or greater than the diameter of the body 33. The washer as shown in the plan view portion of FIG. 4 is provided with a central hole 42. The clip or washer may be initially dished or bent as shown in the sectional elevation view portion of FIG. 4.

With a pair of heads mounted in holes 31 of housing 30, the clip 40 is placed with its ends abutting the flats 38 and a screw 44 is passed through hole 42 and threaded into housing 30. The length of the clip is chosen such that in position its extremities 48—48 will exert a slight pressure against the bodies 33 allowing the heads to be moved lengthwise, while at the same time establishing the directional orientation of the heads and the poles contained therein, thereby orienting the magnetic flux path of each head. By screwing in the screw 44 further the clip 40 will tend to flatten and the pressure force exerted by the clip on the heads will be intensified to a desirable value to lock the head positively against movement relative to housing 30.

Figure 5:
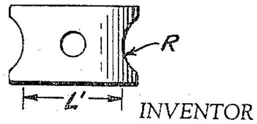
FIG. 5 is a plan view of a variation of the fastener clip.

An alternative form of the spring clip is shown in FIG. 5 which may be used in cases where precise orientation of the heads is not deemed necessary or desirable, and the head may have a straight cylindrical form without the previously described flattened portion. As before the clip is of rectangular form and functions as described in connection with FIG. 4, however, the difference is that the ends have semi-circular notches therein with radii substantially equal to the radii of the cylindrical body of the head, and with the deepest points of the notches spaced apart a distance L′ somewhat greater than the closest distance between the perimeters of two heads when mounted in housing 30 as described above.

One method of setting and fastening the heads will now be explained with reference to FIGURES 1 and 2. In FIG. 1 a pair of heads 32—32 have been mounted in holes 31—31 of housing 30, the clip 40 is placed in position and the screw 44 is threaded in to merely contact the clip. The heads are at first positioned with their innermost ends well out of contact with the perimeter of the drum 10. By means of the screw 24 the thrust bearing box 20 may be moved towards the small end of the drum while in contact with runner 18 which carries along the drum until the journal portions thereof have achieved physical contact with the bearings 12—12 as shown in FIG. 1. In this position the heads 32—32 are pushed or tapped inwardly until the pole elements 36 contact the drum perimeter, whereafter the screw 44 is tightened, thereby compressing the clip 40 to force the ends thereof against flats 38 and positively lock the heads 32—32 in this position. By means of screw 24 the drum is next moved in the direction of its large end until the perimeter thereof has the position shown in FIG. 2 and a predetermined air gap is established between the pole elements 36—36 and the drum.

The method of displacing the drum in a manner that the rotatable and stationary elements are in physical engagement in the position away from the normal running position has been described. In cases where pressurized gas lubricated bearings, i.e., hydrostatic bearings, are used, an alternate method is possible. While the drum as before is not rotated, the pressurized gas medium is introduced in the journal bearings 12 and thrust bearing box 20. By means of screw 24, box 20 is moved as before to axially displace the rotatable system, however, the runner 18 will be centralized between the complementary thrust bearing faces of box 20 as in normal running condition of the drum. The drum is then axially displaced in the direction of the apex of the cone until the perimeter of the drum, because of this displacement, is located with any point in a complementary, imaginary, enveloping conical surface a predetermined distance from the axis of the drum in its nondisplaced, i.e. running, position. This distance is equal to the desired air gap, and the heads are set and locked as described above.

The body 33 is commonly manufactured of comparatively soft material, e.g. aluminum, which may be susceptible to indentation by the spring clip in the form described above. FIGURE 6 illustrates a spring clip 140 of an improved shape, which prevents denting or marring of the heads. As before the clip has a central hole 42 through which passes the screw 44 threaded into housing 30. The ends of this washer are shaped with arcuately bent portions 146 presenting rounded extremities 148—148 adapted to make tangential contact with flattened portions 38—38 of a pair of heads 32 which are mounted as shown in FIGURES 6 and 6*a*.

In cases where it is desirable to fix a single head to housing 30 another flattened portion 138 may be provided on body 33 opposite and parallel to portion 38 and a spring clip 240 of a different shape is employed, as shown in FIGS. 7 and 7*a*. The clip 240 is made from a rectangular washer of flexible material having two parallel slots 241 extending lengthwise and spaced apart a distance greater than the diameter of the head. Close to one end of the slots the portion between the slots is slitted to form two tongues of unequal lengths. The shorter tongue is bent upwardly as seen in FIG. 7 to form a curved abutment 243 adapted to contact portion 138. The longer tongue is arched at 245 with its top facing the same direction as the bend of the shorter tongue, and this tongue terminates with an arcuately bent portion 246 presenting a curved extremity 248 adapted to make tangential contact with the flat portion 38. The distance between abutment 243 and extremity 248 is preferably equal to or less than the distance between flat portions 38 and 138. A screw 244 is passed through a hole 243 in the top of arch 245 and threaded into the housing. By tightening this screw the arch will flatten, and cause abutment 243 acting against portion 138 to restrain any tendency for the washer 240 to slide lengthwise; furthermore, the extremity 248 will exert a force against portion 38, thereby introducing the desired locking effect of head 32.

The described preferred embodiment, wherein the perimeter of the drum is also the drum journal, is susceptible to many variations. Instead of such a bearing arrangement the journals may be provided on shaft extensions or other means with the condition that the drum is axially displaceable for the purpose explained. Furthermore, instead of using the drum itself as a device to set the heads, a plug or a master standard may be substituted as a tool for adjusting and fixing the air gap. This master may be made with diametrical dimensions larger or smaller than the drum proper to meet varied requests of air gap size. The use of a master is advantageous in the respect that undue handling of the drum proper during assembly and adjustment of the device is avoided by reason both of the possibility of damage to the magnetizable layer, and a favorable means of control and economy in the manufacturing and maintenance procedure.

Such a master and a method of utilizing the same must be provided in case the drum proper is a true circular cylinder, where obviously, a displacement in axial direction thereof will have no effect in changing the radial spacing of the drum perimeter and the heads positioned thereabout. FIGURE 8 is a schematic showing of the use of a master 300 having journals 312. The master is of the same general configuration as the drum of the device in question and the journals are complementary to the drum bearings in a structure 128. The diameter "M" of the master is larger than the diameter of the magnetizable drum proper by an amount twice the desired air gap. With the master in the position shown, heads 32—32 mounted in holes 31—31 of a housing portion 130 of the structure 128 are moved until extremities of the elements 36—36 contact the perimeter of the master, whereafter the heads are locked to the housing by means of clip 40 and screw 44. The elements 36 of the heads are now fixed at equal radial distances from the axis of the drum, and by removing the master and assembling the drum in same bearings, the desired air gap is established.

I have disclosed a novel structure of a signal transmitting head including fastening means therefor, and a method to set such head in proper relationship to complementary elements of a magnetic data storage device in general and, more particularly, a storage device as described in co-pending application No. 649,984. To those skilled in the art, it will be apparent that various modifications may be made without departing from the spirit and scope of the invention, as defined in the appended claims.

I claim:

1. In a magnetic data storage device having a magnetizable record surface movable in relation to a stationary member and a plurality of transducer heads having substantially cylindrical bodies adapted to be adjustably positioned in apertures through the said stationary member with their flux path elements in close proximity with the said record surface, an improved transducer head setting and locking device comprising: a bowed fastener clip constructed of spring material, the said bowed fastener clip having two end portions conforming with the shape of and contacting a portion of the surface of the bodies of two adjacent transducer heads while bearing on the surface of the said stationary member and a portion intermediate the said two ends arched away from the said surface of the stationary member; and means adjustably compressing and flattening the said arched portion whereby the said adjacent transducer heads are maintained in a set position by the locking and holding force exerted by the said ends.

2. A device as defined in claim 1 wherein the means adjustably compressing and flattening the said arched portion comprises a fastening screw extending through a hole substantially intermediate the ends of the said bowed fastener clip and threaded into the said stationary member.

3. In a magnetic data storage device having a magnetizable record surface movable in relation to a stationary member and a plurality of transducer heads having substantially cylindrical bodies adapted to be positioned in apertures through the said stationary member with their flux path elements in close proximity with the said record surface, the said transducer head bodies having a flattened portion extending lengthwise over part of the cylindrical surface for orientation of the said flux path in relation to the path of travel of the said record surface, an improved transducer head setting and locking device comprising: a bowed fastener clip constructed of spring material, the said bowed fastener clip having two end portions contacting the flattened portion of the surface of the bodies of two adjacent transducer heads while bearing on the surface of the said stationary member and a portion intermediate the said two ends arched away from the surface of the said stationary member; and means adjustably compressing and flattening the said arched portion whereby the said adjacent transducer heads are maintained in a set position by the locking and holding force exerted by the said ends with the flux paths of the said transducer heads automatically oriented in relation to the path of travel of the record surface.

4. A device as defined in claim 3 wherein the means adjustably compressing and flattening the said arched portion comprises a fastening screw extending through a hole substantially intermediate the ends of the said bowed fastener clip and threaded into the said stationary member.

5. A device as defined in claim 3 wherein the ends of the said bowed fastener clip are provided with means to prevent marring of the surface of the flattened portion on the said bodies of the transducer heads.

6. A device as defined in claim 3 wherein the ends of the said bowed fastener clip are provided with arcuately bent portions to prevent marring of the surface of the flattened portion on the said bodies of the transducer heads.

7. In a magnetic data storage device having a magnetizable record surface movable in relation to a stationary member and a plurality of transducer heads having substantially cylindrical bodies adapted to be positioned in apertures through the said stationary member with their flux path elements in adjustable close proximity with the said record surface, the improvement that comprises: a transducer head setting and locking device consisting entirely of one bowed fastener clip constructed of substantially thin resilient material, having at least one end in contact with a portion of the surface of the body of at least one transducer head; the two ends of the said bowed fastener bearing directly upon the surface of the said stationary member and the bowed portion intermediate the said two ends being arched away from the said surface; and means adjustably compressing and flattening the said arched portion whereby the said transducer head is maintained in a set position by the locking and holding force exerted by the said end of the fastener.

8. In a magnetic data storage device having a magnetizable record surface movable in relation to a stationary member and at least one transducer head having a substantially cylindrical body adapted to be positioned in an aperture through the said stationary member with its flux path element in adjustable close proximity with the said record surface, the improvement consisting of: two flattened portions extending lengthwise in parallel planes over the part of the cylindrical surface of the body of the said transducer head which is situated above the said stationary member; a fastener clip constructed of spring material and having an opening for receiving the said body therein; the said opening having two reference straight edges coacting with the said flattened portion on the body of the transducer head for orienting of the flux path of the said transducer head; one of the said straight edges being a fixed abutment edge and the other being the end of a partially cut-out bowed tongue element integral with the said fastener clip; and means adjustably compressing and flattening the said bowed tongue element whereby the said transducer head is maintained in a set position by the locking and holding force exerted by the said straight edges with the flux path of the said transducer head automatically oriented in relation to the path of travel of the record surface.

9. A device as claimed in claim 3 wherein the said straight edges of the fastener clip are provided with means to prevent marring of the surface of the flattened portions on the body of the transducer head.

10. A device as claimed in claim 3 wherein the said straight edges of the fastener clip are provided with arcuately bent portions to prevent marring of the surface of the flattened portions on the body of the transduecer head.

References Cited in the file of this patent

UNITED STATES PATENTS

| | | |
|---|---|---|
| 2,680,785 | Franklin | June 8, 1954 |
| 2,700,588 | Williams et al. | Jan. 25, 1955 |
| 2,708,693 | Hendrickson | May 17, 1955 |
| 2,713,386 | Holtz | July 19, 1955 |
| 2,790,966 | Malbon et al. | Apr. 30, 1957 |
| 2,802,201 | Casagrande | Aug. 6, 1957 |
| 2,831,180 | Hasbrouck | Apr. 15, 1958 |
| 2,862,067 | Christoff | Nov. 25, 1958 |
| 2,864,892 | Perkins | Dec. 16, 1958 |

UNITED STATES PATENT OFFICE

CERTIFICATE OF CORRECTION

Patent No. 3,001,181 September 19, 1961

Hugh M. Taft

It is hereby certified that error appears in the above numbered patent requiring correction and that the said Letters Patent should read as corrected below.

Column 6, lines 35 and 39, for the claim reference numeral "3", each occurrence, read -- 8 --.

Signed and sealed this 13th day of February 1962.

(SEAL)
Attest:

ERNEST W. SWIDER
Attesting Officer

DAVID L. LADD
Commissioner of Patents